A. THOMA.
MACHINE FOR FILLING THE BOTTOMS OF SHOES.
APPLICATION FILED MAR. 28, 1912.
1,225,372.  Patented May 8, 1917.
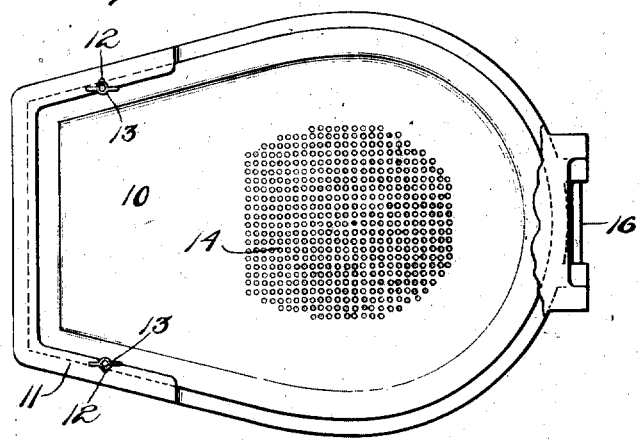
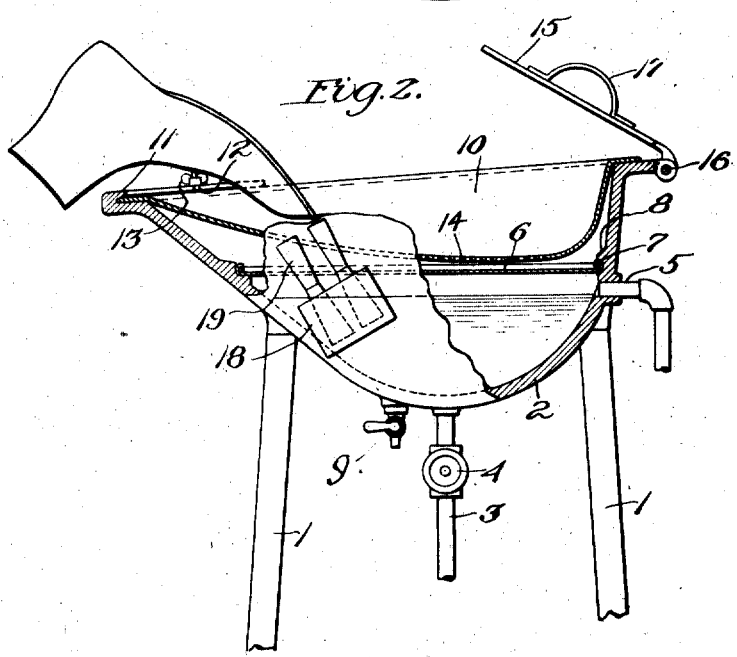

UNITED STATES PATENT OFFICE.

ANDREW THOMA, OF CAMBRIDGE, MASSACHUSETTS, ASSIGNOR TO NORTH AMERICAN CHEMICAL COMPANY, OF NEW YORK, N. Y., A CORPORATION OF MAINE.

MACHINE FOR FILLING THE BOTTOMS OF SHOES.

1,225,372.      Specification of Letters Patent.      Patented May 8, 1917.

Application filed March 28, 1912. Serial No. 686,977.

*To all whom it may concern:*

Be it known that I, ANDREW THOMA, a citizen of the United States, and resident of Cambridge, county of Middlesex, State of Massachusetts, have invented an Improvement in Machines for Filling the Bottoms of Shoes, of which the following description, in connection with the accompanying drawings, is a specification, like letters on the drawings representing like parts.

The object of the present invention is to facilitate the handling of shoe-bottom filler in connection with the application thereof to the innersole cavity of the shoe-bottom of a shoe in the manufacture thereof. While this form of apparatus is adapted to the handling of practically all the shoe-bottom fillers which I have patented, it is primarily intended for that kind of bottom filler which is disclosed in my Patent No. 1,032,312, dated July 9, 1912, in which I provide the filler with a component which is virtually a potential paste held in suspension throughout the filler, ready to be turned into actual paste at the moment of use so as to act as a stiffening agent for toughening and thickening the filler mass when actually in the shoe and so as to have the filler in a sleek condition when being applied. For instance the gummy, waxy sticky filler mass of my Patent No. 832,002 (to select this patent merely as a convenient example of such gummy filler) has (in order to constitute said paste filler) thoroughly mixed through it a potential paste in the form of comminuted powder or flour, such as dextrin, starch, gluten, casein, albumen, or the like, which is thoroughly enveloped by the sticky component of the filler so that the grains or particles of the granular stiffener cannot turn into actual paste until subsequently swelled and thickened by suitable means. The most practical means for producing this desired chemical and physical action and result is heat and moisture whereby the filler is changed into the desired mucilaginous cohesive stiffened and thickened condition by reason of said swelling of the stiffening ingredient in intimately mingled and mutually enveloped and sub-divided relation to the remaining components of the filler mass.

While the machine is primarily intended for the filler in the state above explained, i. e. for the full development of the filler from its latent condition above explained, I wish it understood that the machine is advantageous for handling the filler in a fully developed condition. For instance, when the kind of filler of my first above mentioned patent is being used, my present machine will handle the filler admirably when the paste-forming ingredients or stiffener has already been converted into a paste, in which case the steaming and heating of the machine simply serves to soften the mass and keep any portion thereof from drying out, the heat and moisture serving then to produce the most efficient form of fluxing of both components of the filler and maintain the latter in the highly plastic or spreadably mobile and workable condition desirable for the rapid filling of shoe-bottoms.

Accordingly, my present machine aims to provide means for permitting such filler to be used continuously and with extreme facility. In its general aspects, it consists of a steaming basin for subjecting the filler to a thorough steaming or cooking sufficient to complete the formation of the filler by subjecting the paste-making ingredients to the desired swelling and thickening process within the filler mass, and a subjacent mechanism for producing the proper flood of moisture, preferably in the form of steam, and delivering it within the filler mass in the steaming basin. My invention also includes means for preventing the escape of any of the filler into the vapor-producing chamber. Besides these general features, the invention includes a large number of less valuable but important points of novelty. All of these features will be more fully understood in the course of the following description, taken in connection with the accompanying drawings, in which I have shown a preferred embodiment of the invention.

In the drawings,

Figure 1 is a top plan view thereof, partly broken away; and

Fig. 2 shows the machine in side elevation and partly in section, parts being broken away for convenience of illustration.

While it will be understood that the invention in its broader aspects may be embodied in a wide variety of mechanical devices, I have chosen herein that form which is the most simple and inexpensive to make and use and, withal, highly practical. In any case the invention is limited to the art of shoe manufacture and is restricted to the filling of shoe bottom cavities with the type of filler explained in the patents herein mentioned. On suitable legs or standards 1 is mounted a tank 2, preferably a casting, tapped at its bottom for the inlet of steam from a steam pipe 3 controlled by a valve 4 and at its side for an outlet or overflow, pipe 5. Normally this tank is filled with water to about the level shown in the drawings, and just above this water I mount a suitable fine splash-protector and vapor-feed 6 capable of transmitting a flood of vapor but stopping the splashing and bubbling of the water and also serving to render it impossible for any of the filler to escape down into the latter, and for this purpose I have found that a piece of canvas or duck is the most convenient partition and moisture conveyer, said duck being stretched and clamped in position by a hoop 7 sprung into wedging relation with the canvas beneath lugs 8. A fine wire mesh screen can take the place of the duck, but, as will appear later on, the duck is capable of performing additional functions of considerable practical advantage which a metal vapor-feed cannot. This vapor feed 6 and the coöperating finely perforated bottom 14 above it, serves to automatically regulate the moisture transmitted to the filler in the basin so that an even tempering moisture is delivered within the mass of the filler, i. e., just enough and no more. It constitutes means for restricting and controlling the amount of moisture transmitted. It will be understood that, with this peculiar filler, only the right amount of moisture must be delivered. The filler must be brought to just such a condition of plasticity, pastiness, slipperiness, and sleekness, and if this is exceeded the filler is thereby deteriorated, and if flooded or saturated it is ruined. Accordingly I have devised a construction which will permit just the right amount of moisture to go into the filler, and when that amount of moisture has reached the filler, it automatically stops. This is because the holes are just right to permit the right amount of moisture to pass through at the start and then when the pasty condition is developed the holes are more or less closed because of this pasty condition. If the holes were larger, they could not be closed, nor partially closed, but instead, the vapor would continue to rise and would simply wash away the paste from the holes and there would be no self-regulating action. Moreover, the excess of moisture would wash or strip the paste from the cork, thereby completely spoiling the filler, and if the holes were fairly large they would permit the cork particles then to fall through the holes.

This shoe bottom filler is a plastic compound to be pressed into the shoe bottom cavity of Goodyear welt shoes to make the bottoms level to receive the outsole, and it is and must remain sufficiently coherent and adherent to hold the outsole subsequently in a comfortable, level position to support the foot of the wearer. This filler is a substance, which, when set or stiffened to its ultimate condition within the shoe, is permanently pliable and flexible, light in weight, cohesive, somewhat like leather, capable of adhesion to the bottom of the inner sole and to the top of the outsole within the shoe so as to constitute the connecting adhesive located between the outsole and the inner sole for holding them together. It is so constructed that it is capable of being rendered freely plastic by the combined heat and moisture of this machine and yet it may be left by the machine in such a way that it will be capable of becoming set to the foregoing leather-like condition of stiffness, tenacity and flexibility, at once upon being placed in the shoe bottom cavity. If cork is the body material of the filler, it is always in a finely ground or granular condition, and the filler is never brittle nor hard and friable, but must always remain plastic and never become disintegrated. Bearing the foregoing peculiar conditions in mind, it will be appreciated that one of the principal features of my invention resides in providing means which will bring about the proper plastic, slippery and uniform condition of the filler mass, without any liability of going too far, as the shoe factory requirements make it necessary that the filler shall be kept in this sensitive and critical condition during the day, while the operator is filling the shoes, i. e. the moisture must not merely put the filler into this condition, but it must maintain the filler in this condition, and do so without destroying the quick-setting character and unchangeable character of the filler, (i. e. unchangeable, provided the filler is kept under normal conditions). The character of the result of the heating is all-important. In addition to the small size and restricted area of the holes 14, the use of a canvas diaphragm or vapor feed 6, is further advantageous because of the fact that it is more permeable by the steam at the beginning and then closes up as its fibers become saturated and swell, which conduces to still nicer regulation, in addition to the automatic regulation above referred to as primarily due to the perforated bottom 14. A pet-cock or valve 9 is provided for the purpose of drawing off hot water to sprinkle the filler when a fresh batch has been put in the basin. Above the splash-protector screen or disk or vapor-feed 6 is a steaming basin or filler-holder or pot 10, herein shown as a stamped-out sheet metal basin, relatively deep at its rear end and shaped so as to fit snugly beneath an overhanging flange 11 of the casting around the forward end or lip portion and rest down upon the peripheral top edge of the casting throughout its entire extent. Preferably suitable clamping devices may be employed for coöperating with said flange, the latter being shown as having notches 12 engaged by thumb screws 13 extending upwardly thereinto from the basin. The bottom of the basin is perforated as indicated at 14 for the distributed passage of the moisture, and if desired the entire back portion of the basin may be similarly perforated but not the front part which is so shaped and related to the rest of the machine as to enable the operator to hold a shoe, bottom up, in one hand, with the toe of the shoe pointing slightly into the filler basin or pot as indicated in Fig. 2 while he deftly lifts a spoonful of filler on the hot spreader knife from the pot into the shoe bottom and instantly spreads the slimy, slippery, smeary filler in proper flat adhesion in the shoe bottom. Also, restricting the area of the small holes 14 to the center of the chamber constitutes means to deliver the moisture to the middle or center of the mass of the filler, whence it permeates the entire mass evenly to maintain the filler properly plastic or semi-fluid and sluggishly moldable. As the filler mass is held all around this middle area, it is uniformly supplied with the vapor or steam which I introduce directly into the mass of material in the hopper to aid in preparing and keeping it in proper condition for application to the shoe-bottom. The rear portion of the basin is preferably overhung or inclosed by a cover 15 hinged at 16 and quickly turned back by a handle 17. At one side of the casting I provide a heavy block 18 of metal in the form of a pocket for holding the spreader knives 19 somewhat after the manner shown in Patent No. 808,227 of December 16, 1905, in which means is provided for heating the same kind of spreader knives or spatulas.

In use, the proper amount of water being in the tank as shown, steam is turned on from the steam pipe 3 until the water is raised substantially to the boiling point and the apparatus has become heated. The filler mass is then dumped into the basin 10 in loaves (first pulled apart into small pieces by the operator, if in the loaf form shown in the drawing of my Patent 832,002) or granulated and mealy (if in this form of my Patent 1,032,312) or otherwise according to whatever its condition may be as originally prepared or subsequently treated (if desired). Let it be supposed that the filler is of that variety which contains a latent starch or paste-forming component. This form is sometimes dry and mealy, and looks almost like the simple, dry, granulated cork. As soon as it is in the basin 10, the vapor at once begins to convert the paste-forming portion of the filler mass around each individual grain of cork into a fluffy soft condition constituting a delicate film in among the more sticky globules and fine cork chunks of the filler, thereby developing in a finely disseminated and attenuated condition throughout the filler the element which will subsequently tend to stiffen and harden the filler, subject to the modifying control of the equally attenuated and subdivided gummy constituent of the filler, which will serve to prevent the filler from becoming actually stiff so as to lose its pliability. The heat of the vapor also serves to amalgamate the otherwise opposing chemical elements of the filler. This takes place evenly and continuously in the filler while the operator is dipping it out with his hot spatula or knife 19 and placing it rapidly in the succeeding shoe-bottoms. The cover 15 retains the heat at the back portion of the basin 10 so as to effect the desired results rapidly and keep the temperature in the filler more even. The canvas diaphragm or splash-protector and vapor-feed 6 is quickly charged with moisture so that it becomes wringing wet, and then the intense heat below it of the boiling water serves continually to vaporize the moisture thus contained in the canvas so that the steaming vapor from the wet canvas is continually arising in a condition that is perfectly even in temperature and in humidity and in quantity. I have found it exceedingly difficult to carry out my present process by turning either steam or spray directly into the filler, and accordingly I regard this provision of the canvas protector and vapor-feed as an especially advantageous feature of the invention. The swelling of the fiber in the cloth makes it impossible for the steam to pass through in a free quantity, so that thereby special skill and attention which would otherwise be required are eliminated. If a wire screen such as already mentioned is used, considerable attention is required to regulate the valve 4 to just that nicety which will permit only the desired amount of moisture to get into the filler, whereas no such special care is required when a transmitting device such as the canvas layer 6 is employed.

This invention is not a cooker or disintegrator in any sense, but resides in my discovery that my peculiar shoe bottom filler can be rendered exceedingly sticky, and given a sleek, or smooth, slippery condition without being deteriorated, simply by being impregnated with an even amount of moisture, not sufficient to wash off the binder from the cork chunks, or granules, but yet just sufficient to render active the pasty member of the stiffener and put the finely subdivided and disseminated globules of waxy matter into the proper condition to coalesce somewhat and immediately ramify each other, so that the moisture serves to flux the filler elements and bring about the proper union or stiff, plasticity or sluggishly moldable condition. This is the new result aimed at and secured by my invention.

And my invention, broadly stated, and as intended to be covered in the broader claims hereinafter contained, consists of providing means or mechanism, of whatever kind, capable of and adapted to bring about and maintain this result in a continuous and automatic manner in connection with the filler mass within the holding and heating chamber. I believe that I am the first to conceive and produce this result with a shoe bottom filler and the first to embody means for carrying out this conception.

When the filler is first put into the basin 10, it is sometimes desirable, in order to hasten its initial fluxing, to draw off a small quantity of hot water from the cock 9 and sprinkle it over and mix it into the filler mass, thereby making it practicable to start using the filler almost immediately. While it is possible to bring the filler into the right temper by mechanical manipulation under the conditions mentioned, my machine renders it practically automatic after it has once begun. There is no drying out of the filler by the machine because the moisture keeps all the filler in properly tempered condition, nor is there any introduction of actual water or excess of moisture into the filler after the initial mixture thereof with hot water when starting the apparatus, because, first, the apparatus is constructed to be practically automatic and self-regulating, and, second, the swelling of the starchy or stiffening component quickly renders it practically impossible for an excess of moisture or steam to be incorporated into the filler by the gentle means provided by my machine. A further feature of value is that the front portion of the basin is imperforate and the edges of the basin are either clamped or otherwise tightly held against the tank, so that the operator is using the filler from that portion of the basin which cannot deliver any steam and therefore he is not subjected to the inconvenience of having steam come against his hand or into his face. The process herein set forth, and originally herein claimed, has been divided out from this case. The process is now broadly covered in my Patent No. 1,118,161, dated Nov. 24, 1914.

Having described my invention, what I claim as new and desire to secure by Letters Patent is:

1. A shoe bottom filling machine, comprising a chamber for holding the filler for use, said chamber being constructed and adapted to handle a filler composed of finely granulated cork and a binder, combined with means for the restricted passage of an even tempering moisture to and within the filler-mass in said chamber, said means containing as a part of its construction means for evening the distribution of the moisture and restricting said moisture to a tempering amount sufficient merely for developing and maintaining the stickiness of the filler without washing off or deteriorating the binder portion of the filler with relation to the cork, and said chamber and first mentioned means coöperating to retain in the chamber all the filler in a finely moistened and tempered condition for the operator.

2. A shoe bottom filling machine, comprising a chamber for holding the filler for use, said chamber being constructed and adapted to handle a filler composed of finely granulated cork and a binder, combined with means for the restricted passage of heat and an even tempering moisture to and within the filler-mass in said chamber, said means containing as a part of its construction means for evening the distribution of the moisture and limiting said moisture in accordance with the requirements of the filler to an amount and flow sufficient merely for developing and maintaining the filler in a homogeneous, sticky, united condition without washing off or deteriorating the binder portion of the filler with relation to the cork, and said chamber and first-mentioned means coöperating to retain in the chamber all the filler in a finely moistened and tempered condition for the operator.

3. A shoe bottom filling machine, comprising a chamber for holding the filler for use, said chamber being constructed and adapted to handle a filler composed of finely granulated cork enveloped in a binder, having latent capacity for increased stickiness, combined with mechanism for heating the filler and for simultaneously introducing a tempering fluid to and within the filler-mass in said chamber, said mechanism containing as a part of its construction means for evening and distributing said fluid in limited amount to the filler-mass sufficient merely, in connection with the heat, for developing and quickening the latent binder so as to maintain the stickiness of the filler without washing off or deteriorating the binder portion of the filler with relation to the cork, and said chamber and mechanism coöperating to retain all the filler in said finely moistened and tempered sticky condition in the chamber ready for the operator.

4. A shoe bottom filler machine, comprising a chamber for holding the filler for use and adapted to contain a filler composed of comminuted cork intermingled with a binder, said chamber having a bottom perforated with a restricted area of fine perforations capable of permitting the upward passage of vapor while preventing the downward escape through the bottom of the filler, the front part of the supporting portion of said bottom having the vapor directly excluded therefrom to facilitate the holding of the filler thereat by the bottom and the manipulating of the filler from said bottom into the shoe.

5. A shoe bottom filler machine, comprising a tank containing a water chamber, means for heating and vaporizing the water therein, a filler receptacle constructed and arranged to support and retain the filler, said receptacle being mounted within the influence of the heated vapor from said chamber, and having provision for affording the vapor direct access to the filler in one part of the receptacle and for excluding said vapor from said direct access to the filler in another part of the receptacle.

6. A shoe bottom filling machine, comprising a tank having an open upper side, a filler basin removably mounted therein, and having a bottom for retaining the filler in the basin for use and capable of permitting and restricting the passage of moisture to the filler, and means within said tank for heating the said filler to a sluggishly plastic condition and means for restricting and controlling the transmission and delivering an even supply of moisture thereto, to maintain said sluggishly plastic condition of the filler.

7. A shoe bottom filler machine, comprising a tank having a water chamber, means for heating the water therein, a filler basin above said water chamber, and a distributing and restricting diaphragm between said basin and chamber for permitting a distributed and restricted passage of moisture from the latter to the filler within the basin.

8. A shoe bottom filler machine, comprising a tank for hot water, a receptacle in the upper portion thereof for containing and retaining filler in a softened, plastic condition for removal from the top only of the receptacle, means for closing in the heat over the holding portion of the receptacle, and leaving the front portion open with free access to the filler and means for affording access for moisture from the water tank to the filler receptacle.

9. A shoe bottom filler machine, comprising a tank for hot water, a receptacle in the upper portion thereof for filler, means for closing in the heat over the holding portion of the receptacle, and leaving the front portion open with free access to the filler, means for affording access for moisture from the water tank to the filler receptacle, and means for drawing off hot water from the water tank for starting the filler.

10. A shoe bottom filler machine, comprising a tank for hot water, a receptacle in the upper portion thereof for filler constructed and arranged to hold and retain therein a finely comminuted cork filler in a soft, plastic, sluggishly fluid condition, means for affording access for moisture from the water tank to the filler receptacle, and means for drawing off hot water from the water tank for starting the filler.

11. A shoe bottom filler machine, comprising a steaming tank, a foraminous filler receptacle above the same, and an intervening textile diaphragm for evening and tempering the moisture in its passage to the filler.

12. A shoe bottom filler machine, comprising a steaming tank, a foraminous filler receptacle above the same, and an intervening textile diaphragm removably mounted in said tank for evening and tempering the moisture in its passage to the filler.

13. A shoe bottom filling machine, comprising a chamber adapted to contain a filler of comminuted cork intermingled with a binder having a latent capacity of increased stickiness, combined with mechanism to supply heat and moisture to the filler, constructed and arranged to restrict the delivery to less than a washing or disintegrating amount of moisture, including means to deliver the same to the middle of the mass of filler, to maintain the filler heated and properly plastic, and to develop to a superior degree said latent stickiness, and means to regulate the steam delivery according to the needs of the mass, without tendency to wash off or deteriorate the binder portion of the filler with relation to the cork, said chamber and mechanism coöperating to retain in the chamber all the filler in a finely moistened and tempered sticky condition for the operator.

In testimony whereof, I have signed my name to this specification, in the presence of two subscribing witnesses.

ANDREW THOMA.

Witnesses:
 JAMES R. HODDER,
 EDWARD MAXWELL.